United States Patent Office

2,880,248
Patented Mar. 31, 1959

2,880,248

RADICAL ADDITION REACTIONS OF HALOGENATED OLEFINS AND COMPOUNDS PRODUCED THEREBY

William T. Miller, Ithaca, N.Y., assignor, by mesne assignments, to Minnesota Mining and Manufacturing Company, St. Paul, Minn., a corporation of Delaware No Drawing. Application July 12, 1955
Serial No. 521,640

13 Claims. (Cl. 260—653)

This invention relates to novel radical addition reactions of perhalogenated alkanes with halogenated ethylenically unsaturated compounds.

The principal reactions occuring in the process of the present invention are as follows, in which $CX_4$ is a perhalogenated alkane, i.e., a perhalogenated methane:

FREE RADICAL ADDITION OF $CX_4$ TO AN OLEFIN $\overset{|}{C}=\overset{|}{C}$

[Principal reactions]

*Initiation*

(1) $CX_4 \overset{h\nu}{\rightleftharpoons} CX_3 \cdot + X \cdot$

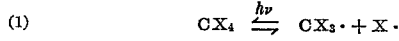

*(2)*

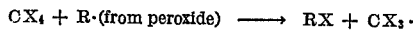

*Polymerization*

*(3)*

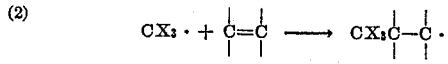

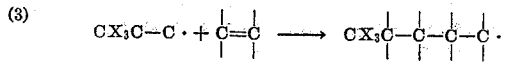

*Chain transfer*

*(4)*

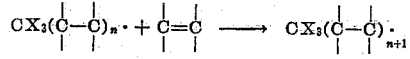

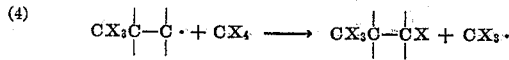

*Termination*

*(5)*

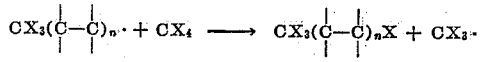

*(6)* $CX_3 \cdot + X \cdot \longrightarrow CX_4$

In the above reactions, the radical $X \cdot$ is produced photochemically; a radical $R \cdot$ from a peroxide may also couple with chain radicals as follows:

$$CX_3 \cdot + R \cdot \rightarrow CX_3R$$

The initial free radicals are produced by the photochemical or thermal dissociation of the halogenated methane or may be produced in any other conventional manner such as by the use of a peroxide catalyst, exemplary of such catalysts being aryl peroxides such as acetyl, benzoyl and pelargonyl peroxides or other sources of free radicals such as the compound:

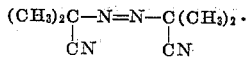

If the radicals formed by the dissociation of the methane do not attack the olefin the observed reaction products are decomposition products derived from the methane, and the process of the present invention does not occur.

The initiation step is followed by a propagation step which can involve a number of olefin molecules for every initiation. An initiating radical can react with an olefin molecule to form a new larger radical, a process leading to polymerization, or stabilize itself by abstracting an atom from a nearby molecule, a chain transfer reaction, with the formation of a new radical which can continue the chain process and lead to a saturated product. If polymerization predominates, relatively high molecular weight products are formed. When chain transfer is more important, the product is primarily the monomer addition product, and if both of these steps are slow, the intermediate radicals have a relatively long life and coupled or disproportionation products are formed in significant quantities.

The radical formed in the reaction of bromotrichloromethane with 2-chloropentafluoropropene is very unreactive. Polymerization does not occur, but the chain transfer step to form the monomer addition product is also slow as indicated by the vigorous conditions required to effect reaction. The intermediate radical has a relatively long life, and the primary by-product of this reaction is the coupled product $C_5Cl_7F_5$ (presumably $$CF_3C(CCl_3)ClCF_2CCl_3)$$

This compound was isolated in about 5 percent yield, along with a smaller amount of the dibromide of the olefin.

The reactivity of chlorofluoro free radicals is indicated to be

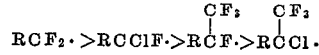

This is also the order which would be predicted on the basis of a steric effect.

An attacking radical, Equation 2, above, might attack either or both ends of an unsymmetrical olefin with the eventual formation of either or both of the possible addition products. It has been shown, however, that a clean-cut orientation effect is operative in free radical reactions involving hydrogen-containing olefins, with only one of the two possible isomers being formed. Furthermore, in every case the initial attack was on the most exposed position to yield the intermediate radical which was predicted to be the most stable.

In the present invention the following illustrative products were obtained from unsymmetrical perhaloolefins:

| Reactants | Products |
|---|---|
| $CBrCl_3 + CF_2 = CClCF_3$ | $CCl_3CF_2CBrClCF_3$ |
| $CBrCl_3 + CF_2 = CFCF_3$ | $CCl_3CF_2CBrFCF_3$ |

These products indicate that the initial attack by $CX_3$ radicals is in each case on the exposed $CF_2=$ carbon. These orientations are the ones which would be predicted from steric considerations.

The alkanes which may be added to halogenated olefins in accordance with the present invention are those having the formula

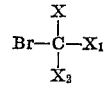

in which X is fluorine, chlorine, or a perhaloalkyl group having not more than about 8 carbon atoms and in which all the halogen atoms are fluorine and/or chlorine; and $X_1$ and $X_2$ are fluorine or chlorine. Exemplary of such compounds are $CBrCl_3$, $CBrCl_2F$, $CBrF_3$ and $CBrClF_2$.

The olefins which may be used in the process of the invention are those having the formula $$CF_2 = CYR_h$$

in which Y is fluorine or chlorine and $R_h$ is a perhaloalkyl radical having not more than 8 carbon atoms, and in which all of the halogen atoms are fluorine and/or chlorine. The $R_h$ radical may also contain a second unconjugated double bond.

Exemplary of the olefins contemplated are $CF_2=CFCF_3$, $CF_2=CFCF_2CF_3$, $CF_2=CF(CF_2)_3CF_3$, $CF_2=CFCF_2Cl$, $CF_2=CFCCl_2CF_3$, and $CF_2=CFCFClCF_2CFClCF_3$.

The most satisfactory olefins for radical addition reactions are the most reactive types, as evidenced by their polymerizability, provided effective chain transfer agents are utilized for addition. However, useful syntheses are also obtained with less reactive olefins which have not been satisfactorily polymerized alone and for which, although the reaction occurs more slowly, the simultaneous formation of polymer is not a problem. On the other hand satisfactory addition reactions are not obtained with disubstituted olefins of the general type, $R_hCF=CFR_h$, in which $R_h$ is a perhalogenated group.

A number of transformations were performed starting with the monomer addition compounds in order to establish structures and to extend the usefulness of the synthetic procedures developed.

The addition product of bromotrichloromethane and 2-chloropentafluoropropene was converted to the following compounds:

$$CF_3CBrClCF_2CCl_3 \xrightarrow{NaI, Acetone} CF_3CCl=CFCCl_3 \xrightarrow{Cl_2} CF_3CCl_2CClFCCl_3$$

$$\downarrow Zn \qquad\qquad HgO \downarrow HF$$

$$CF_3CHClCF_2CCl_3 \qquad CF_3CCl=CFCCl_2F$$

$$\downarrow Cl_2 \qquad\qquad\qquad\qquad\qquad\qquad +$$

$$\qquad\qquad CF_3CCl_2CClFCClF_2 \xleftarrow{Cl_2} CF_3CCl=CFCClF_2$$

$$CF_3CCl_2CF_2CCl_3 \qquad\qquad\qquad\qquad\qquad +$$

$$\qquad\qquad CF_3CCl_2CClFCF_3 \xleftarrow{Cl_2} CF_3CCl=CFCF_3$$

One of the unexpected and useful reactions observed with the sodium iodide reagent is the splitting out of BrF from $CF_3CBrClCF_2CCl_3$ in high yield to form $$CF_3CCl=CFCCl_3$$

It is observed that $C_4BrCl_4F_5$, when treated with zinc in dioxane or zinc in ether, is reduced instead of dehalogenated. The replacement of bromine by hydrogen as a result of treatment with zinc and alcohol represents a useful new synthetic method.

The radical addition reactions of the invention may be effected using a molar ratio of perhalogenated alkane to halogenated monoolefin in the range of 1 to 1 to 20 to 1, a temperature in the range of 20° C. to 250° C., preferably 25° C. to 150° C., and reaction time of 30 seconds to 120 hours, preferably 5 minutes to 12 hours. When a peroxide catalyst is used, it may be employed in a concentration of 0.5 to 10 moles per 100 moles of olefin. The pressure may be in the range of 1 to 100 atmospheres, preferably 1 to 25 atmospheres; autogenous pressure is generally used.

The products produced by the process of the invention are useful as solvents for fluorine-containing polymers, insecticides, fire extinguishing agents, non-flammable hydraulic fluids, lubricating oil additives, and chemical intermediates.

The products of the present invention may also be produced using continuous flow techniques.

The invention will be further illustrated by reference to the following specific examples:

EXAMPLE 1

*Reaction of hexafluoropropene with $CBrCl_3$*

Hexafluoropropene, 21.5 grams (0.14 mole) was sealed in a glass ampoule with 75 grams (0.38 mole) of $CBrCl_3$ and placed in the 5-bulb illuminator. The temperature was gradually raised from 60° to 100° C. over a thirteen-day period. The contents of the ampoule were distilled to yield:

|   | Grams |
|---|---|
| (1) Solid carbon dioxide trap | 3 |
| (2) B.P. 68 to 74° C. | 5.3 |
| (3) B.P. 74 to 102° C. | 4.4 |
| (4) B.P. 102 to 106° C. | 28 |
| (5) B.P. 106 to 145° C. | 12.5 |
| (6) B.P. 145 to 151° C. | [1]26.6 |
| (7) Residue | 10 |

[1] $C_4BrCl_3F_6$, 25 percent.

Fraction 1 was probably unreacted $CF_3CF=CF_2$.

Fraction 2 was probably mostly $CF_3CBrFCBrF_2$, which boils at 72.5° C./760 mm.

Fraction 4 was mostly recovered $CBrCl_3$.

Fraction 6 was redistilled and 6 grams of a centercut were collected. The properties of this fraction were: B.P. 149.9–150.2° C./740 mm.; $d_4^{20}$, 1.9845; $n_D^{20}$, 1.4063; F.P. −78 to −84° C. $MR_D$ for $C_4BrCl_3F_6$: found, 43.2; calculated 43.30. It was tentatively assigned the structure $CF_3CBrFCF_2CCl_3$ on the basis of its reaction with sodium iodide in acetone in a sealed tube at 100° C. for one and one-third hours to form free iodine and a precipitate of NaBr and NaF and by analogy with other addition reactions studied. The olefin was not isolated.

Fraction 7 was cooled in ice and a solid material filtered off. After recrystallization from methanol, this solid melted at 184 to 185° C. (sealed tube). It was thus shown to be $C_2Cl_6$.

EXAMPLE 2

*Reaction of 2-chloropentafluoropropene with $CBrCl_3$*

The following reactions were carried out to prove the structure of the addition product of $CBrCl_3$ and $$CF_3CCl=CF_2$$

$$CBrCl_3 + CF_3CCl=CF_2 \longrightarrow CF_3CBrClCF_2CCl_3 \xrightarrow{Zn} CF_3CHClCF_2CCl_3$$

$$\downarrow NaI \qquad\qquad\qquad\qquad\qquad \downarrow Cl_2$$

$$CF_3CCl=CFCF_3 \xleftarrow[HF]{HgO} CF_3CCl=CFCCl_3 \qquad CF_3CCl_2CF_2CCl_3$$

$$\downarrow KMnO_4$$

$$CF_3CO_2H + CCl_3CO_2H$$

It was found that the reaction of zinc with the addition product, $C_4BrCl_4F_5$, did not produce an olefin; reduction occurred instead to form a $C_4HCl_4F_5$. Treatment of the addition product with sodium iodide in acetone did yield an olefin, but analysis showed the olefin to be a $C_4Cl_4F_4$ formed by the elimination of BrF instead of a $CRCl_3F_5$ expected by the elimination of BrCl. The most highly fluorinated product obtained on fluorination of this olefin was a $C_4ClF_7$. This result indicated the presence of a vinyl chlorine. Oxidation of the olefin yielded trifluoroacetic and trichloroacetic acids. The olefin was assigned the structure, $CF_3CCl=CFCCl_3$, on the basis of the oxidation.

To give rise to this olefin, the structure of the original addition product had to be $CF_3CBrClCF_2CCl_3$, instead of

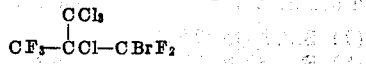

This orientation is in agreement with the prediction that attack by a $CCl_3 \cdot$ radical will take place on the most exposed position, the terminal $CF_2$ group.

*2-bromo-2,4,4,4-tetrachloropentafluorobutane.* — Commercial $CBrCl_3$ was distilled before use, and the fraction boiling from 102 to 104° C. at 730 mm. was utilized. In a typical run, 425 grams (2.14 moles) of $CBrCl_3$ and 295 grams 1.77 moles) of $CF_3CCl=CF_2$ were placed in three Pyrex ampoules. The ampoules were wrapped with nichrome heating wire, placed in the 5-bulb illuminator, and heated so that thermocouples taped to the outside of the ampoules read 120–130° C. The heating and illumination was continued for seven days. The combined contents of the ampoules were distilled to yield:

(1) Solid carbon dioxide trap, 120 grams. Recovered $CF_3CCl=CF_2$.
(2) B.P. 30° C./100 mm. to 117° C./100 mm., 266 grams. Mostly recovered $CBrCl_3$.
(3) B.P. 117 to 120° C./100 mm., 277 grams. $C_4BrCl_4F_5$, 43 percent.
(4) Residue, 52 grams.

The portion of Fraction 3, 210 grams, was redistilled to yield the following fractions:

(5) B.P. 80° C./100 mm. to 119.2° C./100 mm., 11 grams
(6) B.P. 119.2 to 119.5° C./100 mm., 24 grams, F.P. —61 to —68° C.
(7) B.P. 119.5 to 119.7° C./100 mm., 28 grams, F.P. —59.2 to —60.5° C.
(8) B.P. 119.7° C./100 mm., 90 grams, F.P. —58.5° C.
(9) B.P. 119.7° C./100 mm., 30 grams, F.P. —58.5 to —58.7° C.
10. B.P. 119.7 to 119.9° C./100 mm., 18 grams, F.P. —58.6 to —58.7° C.
(11) Residue, 10 grams The presence of largely one isomer was indicated by the fact that 80 percent of the above material froze within one degree and 65 percent froze within one-tenth degree.

The properties were: B.P. 119.7° C./100 mm.; $d_4^{20}$, 2.0374; $n_D^{20}$, 1.4443; F.P. —58.5° C. $MR_D$ found, 47.58; calculated, 48.0.

Redistillation of the combined foreruns from the recovered $CBrCl_3$ fractions through a Podbielniak column yielded about 0.2 weight percent of a fraction containing $CHCl_3$, and about 0.5 weight percent of a fraction consisting mostly of $CCl_4$. Several redistillations of the combined residues from the recovered $CBrCl_3$ fractions yielded about one weight percent of $CF_3CBrClCBrF_2$. Identification of these materials was by means of boiling point and infrared spectra.

The combined residues from several reactions (Fraction 11 and fractions obtained similarly, 330 grams) were redistilled to yield 100 grams of a fraction boiling at 100° C. at 3 mm. The properties of this fraction were: B.P. 100° C./3 mm.; $d_4^{20}$, 1.9295; $n_D^{20}$, 1.4779; molecular weight 403, 406.

Although this compound was not positively identified, a likely possibility is $CF_3CCl(CCl_3)CF_2CCl$, molecular weight 406. $MR_D$ found, 59.54; calculated, 59.60.

EXAMPLE 3

*Reduction of $C_4BrCl_4F_5$ by zinc*

The addition product of a $CBrCl_3$ and $CF_3 CCl=CF_2$, 63 grams, was added to a refluxing suspension of zinc in dioxane. The resulting mixture was washed with dilute acid, then washed with water, dried, and distilled to yield:

(1) B.P. 94 to 127° C., 7 grams
(2) B.P. 127 to 79° C./100 mm., 3 grams
(3) B.P. 79 to 80° C./100 mm., 10 grams
(4) Residue, 22 grams The properties of Fraction 3 were: B.P., 140–143° C./738 mm.; $d_4^{20}$, 1.7201; $n_D^{20}$, 1.4060.

In a similar reaction, 135 grams of the addition product were reacted with zinc in dry ether and worked up as before. Distillation yielded:

Grams
(5) B.P. 34° C./100 mm. to 78° C/100 mm. _____ 26
(6) B.P. 78 to 81° C./100 mm. _____ 20
(7) Tarry black residue _____ 15

Fraction 5 was a complicated mixture. It reacted with chlorine to give products boiling from 55° C. at 10 mm. to 170° C. at 10 mm.

Fraction 6 was redistilled at 100 mm. A center-cut, 6 grams, boiling at 79.0 to 79.5° C. at 100 mm. was collected. Its properties were: $d_4^{20}$, 1.7201; $n_D^{20}$, 1.4080.

Calculated for $C_4HCl_4F_5$: $MR_D$, 40.58; M.W., 285.8; Cl, 49.5 percent. Found: $MR_D$, 40.81; M.W. in benzene, 291, 294, 296; M.W. in symmetrical difluorotetrachloroethane, 256, 272; Cl, 51.9, 50.0, 49.4 percent.

The remainder of Fraction 6, 12 grams, was chlorinated and distilled to yield:

(8) B.P. 166 to 173° C., 4.5 grams
(9) B.P. 108° C/115 mm., to 132° C./115 mm., 4.5 grams
(10) B.P. 132 to 140° C./115 mm., 5.0 grams Fraction 8 was redistilled to yield about 2 grams with the following properties: B.P. 168.0 to 168.5° C./732 mm.; M.W. 316; Cl, 55.3 percent; F, 29.2, 29.8 percent.

Calculated for $C_4Cl_5F_5$: M.W., 320.3; Cl, 55.4 percent; F, 29.6 percent.

The apparent molecular weight of Fraction 10 was 338. Calculated for $C_4Cl_6F_4$, 337.

*Reaction with sodium iodide in acetone.*—In a small-scale reaction, it was found that the addition product gave an immediate precipitate and iodine color with NaI in acetone. This reaction was then extended to a large scale in order to study the product.

The $C_4BrCl_4F_5$ (253 grams, 0.695 mole) was added to a solution of 300 grams (2 moles) of NaI in 1200 grams of C.P. acetone. The reaction mixture was shaken well and allowed to stand twenty-four hours at room temperature.

The mixture was then drowned in water and enough 30 percent sodium hyposulfite solution added to remove the free iodine. After standing for twenty-four hours, the organic layer was separated, dried, and distilled to yield:

(1) B.P. 27 to 130° C., 5 grams
(2) B.P. 130 to 140° C., 160 grams. $C_4Cl_4F_4$, 87 percent
(3) Residue, 12.5 grams Shorter reaction times resulted in lower yields. When the reaction was allowed to stand one-half hour, using 212 grams (0.58 mole) of $C_4BrCl_4F_5$ and 225 grams (1.5 moles) of NaI in 600 grams of C.P. acetone, and worked up as before, distillation yielded:

(4) B.P. 42 to 130° C., 4 grams
(5) B.P. 130 to 138° C., 105 grams. $CRCl_4F_4$, 68 percent.
(6) Residue, 27 grams.

Fraction 5 was redistilled to yield the following fractions:

(7) B.P. 133 to 136.0° C./737 mm., 8.3 grams
(8) B.P. 136.0 to 136.3° C./737 mm., 16.0 grams
(9) B.P. 136.3 to 136.4° C./738 mm., 11.4 grams
(10) B.P. 136.4 to 136.6° C., 10.5 grams
(11) B.P. 136.6 to 136.8° C., 11.5 grams
(12) B.P. 136.8 to 138° C./738 mm., 35 grams

| Fraction | $n_D^{20}$ | $d_4^{20}$ | F.P., °C. |
|---|---|---|---|
| 8 | 1.4229 |  |  |
| 9 | 1.4228 | 1.6980 |  |
| 10 | 1.4229 | 1.6978 |  |
| 11 | 1.4227 | 1.6981 | −86 to −89 |

Calculated for $C_4Cl_4F_4$: $MR_D$ 39.97; M.W. 266, Cl, 53.3 percent.

Found for Fraction 10: $MR_D$ 39.84; M.W. 263, 263; Cl, 53.2, 53.3 percent.

Fractions 8, 9 and 10 were chlorinated. The increase in weight was 9 grams. The resulting material was distilled to yield:

Grams
(12) B.P. 47° C./50 mm. to 115° C./50 mm. ___ 6.5
(13) B.P. 115 to 116° C./50 mm. _____ 7.0
(14) B.P. 116° C./50 mm. _____ 6.2
(15) B.P. 116° C./50 mm. _____ 8.5
(16) B.P. 116° C./50 mm. _____ 8.0
(17) Residue _____ 23.6

Fraction 12 had a reflux boiling point of 135° C. at 740 mm., and was assumed to be mostly recovered $C_4Cl_4F_4$.

| Fraction | $n_D^{20}$ | $d_4^{20}$ | F.P., °C |
|---|---|---|---|
| 13 | 1.4573 | 1.8575 |  |
| 14 | 1.4599 | 1.8568 | −39 to −42 |
| 15 | 1.4598 | 1.8564 | −38 to −42 |
| 16 | 1.4600 |  |  |

$MR_D$ for $C_4Cl_6F_4$, found, 49.66; calculated: 50.04.

*Oxidation of $C_4Cl_4F_4$.*—The olefin resulting from the sodium iodide reaction was oxidized using $KMnO_4$ and $NaHCO_3$. A 30 percent excess of $KMnO_4$ and a 100 percent excess of $NaHCO_3$ was used. The solvent was 3:1 ratio by volume mixture of water and C.P. acetone. About one liter of solvent per mole of olefin was used. The oxidizing solution was cooled in ice and the olefin (73 grams) was added slowly. After all the olefin had been added, the mixture was warmed up to room temperature and stirred overnight.

The excess permanganate was removed by passing in $SO_2$. The solution was filtered, acidified with $H_2SO_4$, and extracted for 48 hours with ether.

The ether layer was distilled to yield:

(1) B.P. 34 to 37° C., ether
(2) B.P. 37 to 101° C., 5 grams
(3) B.P. 101 to 102° C./740 mm., 13 grams. $CF_3CO_2H \cdot 2H_2O$, 30 percent
(4) B.P. 37° C./50 mm. to 125° C./50 mm., 2 grams
(5) B.P. 125 to 127° C./50 mm., 10 grams. $CCl_3CO_2H$, 23 percent
(6) Residue, 1 gram The properties of Fraction 3, an azeotrope of $CF_3CO_2H$ and water, containing 80 percent acid, were: $d_4^{20}$, 1.2343; $n_D^{20}$, 1.3156. The neutralization equivalent calculated for $CF_3CO_2H \cdot 2H_2O$ (80 percent acid) is 150; found, 147, 148. On refluxing with excess ethanol, 5 grams of ester boiling at 59 to 60° C. at 741 mm. was collected. The reported boiling point of ethyl trifluoroacetate is 61.7° C.

A small amount of Fraction 5 was esterified to form ethyl trichloroacetate, boiling at 165° C. at 740 mm., $n_D^{20}$, 1.4070. The reported boiling point of ethyl trichloroacetate is 167 to 168° C.

A second oxidation of the olefin, 30 grams (0.11 mole), was run using a solid carbon dioxide reflux condenser. The oxidation was run and worked up as described above. Distillation yielded:

(7) B.P. 34 to 37° C., ether
(8) B.P. 37 to 103° C., 2 grams. Intermediate
(9) B.P. 103 to 105° C./744 mm., 11.6 grams. $CF_3CO_2H \cdot 2H_2O$, 66 percent
(10) B.P. 105° C./744 mm. to 119° C./50 mm., 1 gram. Intermediate
(11) B.P. 119 to 122° C./50 mm., 10.5 grams. $CCl_3CO_2H$, 55 percent

*Fluorination of $C_4Cl_4F_4$.*—A steel bomb was filled with 157 grams (0.59 mole) of $C_4Cl_4F_4$ from the sodium iodide reaction, 250 grams (1.15 moles) of HgO, and 74 grams (3.7 moles) of HF and shaken for twelve hours at 40 to 100° C. The contents were steam distilled from the bomb, steam distilled again, and the organic layer dried and distilled to yield.

(1) Solid carbon dioxide trap, 1.6 grams
(2) B.P. 30 to 60° C., 3 grams
(3) B.P. 60 to 67° C., 54 grams. $C_4Cl_2F_6$, 39 percent
(4) B.P. 67 to 130° C., 8.7 grams
(5) B.P. 130 to 137° C., 7.5 grams. Recovered $C_4Cl_4F_4$, 5 percent
(6) Residue, 4 grams Fraction 3 was redistilled through column D to yield:

(7) B.P. 60 to 63.7° C., 15 grams
(8) B.P. 63.7 to 63.8° C./730 mm., 9 grams
(9) B.P. 63.8° C./729 mm., 5 grams
(10) Residue, 25 grams The properties of Fraction 9 were: $d_4^{20}$, 1.5873; $n_D^{20}$, 1.3381; F.P. −125.7 to −126.7° C. $MR_D$ for $C_4Cl_2F_6$: found, 30.6; calculated, 30.65.

Fractions 7, 8, and 10 (0.20 mole) were placed in a steel bomb with 55 grams of HgO and 29 grams of HF. The bomb was placed in a rocker-shaker and heated at 60° C. for twelve hours and 125° C. for twenty hours. The contents were steam distilled out of the bomb, steam distilled again, dried, and distilled to yield:

(11) Solid carbon dioxide trap, 2 grams
(12) B.P. 30 to 35° C., 10 grams. $C_4ClF_7$, 23 percent
(13) B.P. 35 to 60° C., 3.5 grams
(14) B.P. 60 to 65° C., 23 grams. Recovered $C_4Cl_2F_6$, 49 percent
(15) Residue, 1.5 grams Fraction 14 added chlorine to yield:

(16) B.P. 125 to 131.5° C., 3 grams
(17) B.P. 131.5° C./740 mm., 20.5 grams
(18) Residue, 3 grams The properties of Fraction 17 were: $d_4^{20}$, 1.7830; $n_D^{20}$, 1.3885; F.P. −89 to −91° C. $MR_D$ for $C_4Cl_4F_6$: found, 40.2; calculated, 40.7. Molecular weight calculated, 266; found 272.

A third fluorination was run, using 84 grams (0.31 mole) of $C_4Cl_4F_4$, 170 grams (0.78 mole) of HgO, and 50 grams (2.5 moles) of HF. The bomb was rocked at room temperature for twelve hours; the temperature was then raised to 155±5° C. over a twelve-hour period, and held there for twelve hours. The bomb was emptied and the contents worked up in the above manner. Distillation yielded:

Grams
(19) Solid carbon dioxide trap _____ 5
(20) B.P. 30 to 32° C. _____ [1]16
(21) B.P. 32 to 105° C. _____ 13
(22) Residue _____ 3

[1] $CRClF_7$, 24 percent.

Fraction 20 was redistilled to yield 4.5 grams boiling at 31.0 to 31.5° C. at 739 mm. The properties of this fraction were: B.P. 32.3° C./760 mm.; $d_4^{20}$, 1.5372; $n_D^{20}$, 1.294. $MR_D$ for $C_4ClF_7$: found, 25.8; calculated, 26.0. Molecular weight calculated for $C_4ClF_7$, 216.4; found 216. The compound contained chlorine, was unsaturated to $KMnO_4$, but showed no reaction when heated with sodium iodide in acetone at 100° C. for two hours. It added chlorine to yield 4 grams boiling at 96.0 to 96.5° C. at 738 mm. with the following physical properties: B.P., 97.5° C./760 mm.; $d_4^{20}$, 1.7458; $n_D^{20}$, 1.3524. $MR_D$ for $C_4Cl_3F_7$: found, 35.6; calculated 36.0.

Reported properties for $CF_3CCl=CFCF_3$: B.P., 32.2° C.; $d_4^{20}$, 1.5482; $n_D^{20}$, 1.2946; and $CF_3CCl_2CClFCF_3$: B.P., 97.5° C.; $d_4^{20}$, 1.7494; $n_D^{20}$, 1.3530.

The above $C_4Cl_3F_7$ and a sample of $CF_3CCl_2CClFCF_3$ isolated as the ClF addition by-product in the reaction of $F_2$ with $CF_3CCl=CClF_3$ were treated with zinc in dioxane. The infrared spectra of the products were identical.

Fraction 21 was redistilled into the following fractions:

(23) B.P. 64 to 104.5° C., 3 grams
(24) B.P. 104.5 to 105.5° C./738 mm., 5 grams
(25) Residue, 3 grams Fraction 24 was unsaturated to $KMnO_4$; $n_D^{20}$, 1.3582; $d_4^{20}$, 1.6362. An expected product of the reaction would be a $C_4Cl_3F_5$ which should boil at this temperature, but the molar refractivity did not check. $MR_D$ for $C_4Cl_3F_5$: found, 33.50; calculated, 35.31.

EXAMPLE 4

*Preparation of bromodichlorofluoromethane*

$CHCl_2F$, was passed through bromine, heated to 32 to 36° C. by an oil bath, then through a 12 x 250 mm. Pyrex tube heated at 475±5° C., using a calculated contact time of from two to five seconds. Excess bromine and HBr were removed by bubbling the vapors through a 20 percent $NaOH-Na_2SO_3$ solution. The product was dried over $CaCl_2$. Distillation of a typical run yielded:

(1) B.P. 8-9 to 49° C., 183 grams. Recovered $CHCl_2F$.
(2) B.P. 49 to 50.2° C., 35 grams
(3) B.P. 50.2° C./734 mm., 31 grams
(4) B.P. 50.2° C., 46 grams
(5) Residue, 8 grams The properties of Fraction 3, $CBrCl_2F$, were: B.P. 51.3° C./760 mm.; $d_4^{20}$, 1.9317; $n_D^{20}$, 1.4304; F.P., −106.4° C. $MR_D$ found, 24.34; calculated, 23.94.

EXAMPLE 5

The physical properties of the purest samples of novel compounds characterized are summarized below:

FORMAT

Molecular Formula—Compound Name—Structural Formula
Source:
B.P. (boiling point at the prevailing atmospheric pressure)
B.P./760 (boiling point corrected to one atmosphere)
B.P. range
F.P. $t_1$ (equilibrium temperature of first appearance of crystals)
F.P. dep. (depression from $t_1$ to the point at which the material was estimated to be half frozen)
F.P. calc. (estimated from cooling curve)
$d_4^{20}$ g. /ml.
$n_D^{20}$
$MR_D$ (molecular refractivity calculated using the Lorentz-Lorenz equation)

$C_3Br_2ClF_5$ Propane, 1,2-dibromo-2-chloropentafluoro-$CBrF_2CBrClCF_3$

Source: $Br_2+CF_3CCl=CF_2$

B.P. _____ 110.2° C./744 mm.
B.P./760 _____ 110.9° C.
B.P. range _____ 0.3° C.
F.P. $t_1$ _____ 2.9° C.
F.P. dep. _____ 0.2° C.
F.P. calc. _____ 3.1° C.
$d_4^{20}$ g./ml. _____ 2.2224
$n_D^{20}$ _____ 1.4060
$MR_D$ _____ 36.1

$C_4BrCl_4F_5$ Butane, 2-bromo-2,4,4-tetrachloropentafluoro-$CF_3CBrClCF_2CCl_3$ Source: $CBrCl_3+CF_3CCl=CF_2$ B.P. _____ 119.7° C./100 mm.
F.P. _____ −58.5° C.
F.P. dep. _____ <0.1° C.
$d_4^{20}$ _____ 2.0374
$n_D^{20}$ _____ 1.4443
$MR_D$ _____ 47.6

$C_4Cl_2F_6$ Butene-2, 1,3-dichlorohexafluoro-$CClF_2CF=CClCF_3$

Source: $C_4Cl_4F_4+HgO-HF$

B.P. _____ 63.8° C./729 mm.
B.P./760 _____ 65.2° C.
B.P. range _____ <0.1° C.
F.P. $t_1$ _____ −125.7° C.
F.P. dep. _____ 0.5° C.
F.P. calc. _____ −125.2° C.
$d_4^{20}$ g./ml. _____ 1.5873
$n_D^{20}$ _____ 1.3381
$MR_D$ _____ 30.6

$C_4Cl_3F_5$ Butene-2, 1,1,3-trichloropentafluoro-$CCl_2FCF=CClCF_3$

Source: $C_4Cl_4F_4+HgO-HF$

B.P. _____ 105.4° C./738 mm.
B.P./760 _____ 106.4° C.
B.P. range _____ 1° C.
$d_4^{20}$ g./ml. _____ 1.6362
$n_D^{20}$ _____ 1.3548
$MR_D$ _____ 33.1

$C_4Cl_4F_4$ Butene-2, 1,1,1,3-tetrachlorotetrafluoro-$CCl_3CF=CClCF_3$

Source: $C_4BrCl_4F_5+NaI$

B.P. _____ 136.3° C./744 mm.
B.P./760 _____ 137.0° C.
B.P. range _____ 0.2° C.
F.P. $t_1$ _____ −86° C.
F.P. dep. _____ 2° C.
F.P. calc. _____ −84° C.
$d_4^{20}$ g./ml. _____ 1.6980
$n_D^{20}$ _____ 1.4229
$MR_D$ _____ 39.8

$C_4Cl_4F_6$ Butane, 1,2,3,3-tetrachlorohexafluoro-$CClF_2CClFCCl_2CF_3$

Source: $C_4Cl_2F_6+Cl_2$

B.P. _____ 131.5° C./740 mm.
B.P./760 _____ 132.4° C.
B.P. range _____ <0.1° C.
F.P. $t_1$ _____ −89° C.
F.P. dep. _____ 1° C.
F.P. calc. _____ −88° C.
$d_4^{20}$ g./ml. _____ 1.7830
$n_D^{20}$ _____ 1.3885
$MR_D$ _____ 40.3

$C_4Cl_5F_5$ Butane, 1,1,1,3,3-pentachloropentafluoro-$CCl_3CF_2CCl_2CF_3$

Source: $C_4HCl_4F_5+Cl_2$

B.P. _____ 168.4° C./732 mm.
B.P./760 _____ 169.2° C.
B.P. range _____ 0.5° C.

$C_4Cl_6F_4$ Butane, 1,1,1,2,3,3-hexachlorotetrafluoro-
$CCl_3CClFCCl_2CF_3$

Source: $C_4Cl_4F_4+Cl_2$

B.P. _____ 116° C./50 mm.
F.P. $t_1$ _____ —38° C.
F.P. dep. _____ 2° C.
$d_4^{20}$ g./ml. _____ 1.8566
$n_D^{20}$ _____ 1.4599
$MR_D$ _____ 49.7

$C_4HCl_4F_5$ Butane, 2,4,4,4-tetrachloro-1,1,1,3,3-penta-
fluoro-$CF_3CHClCF_2CCl_3$ Source: $C_4BrCl_4F_5+Zn$ B.P. _____ 79.5° C./100 mm.
B.P./760 _____ 143° C.
B.P. range _____ 0.5° C. at 100 mm.
$d_4^{20}$ g./ml. _____ 1.7201
$n_D^{20}$ _____ 1.4080
$MR_D$ _____ 40.8

$CBrCl_2F$ Methane bromodichlorofluoro

Source: $CHCl_2F+Br_2$

B.P. _____ 50.2° C./734 mm.
B.P./760 _____ 51.3° C.
B.P. range _____ 0.1° C.
F.P. $t_1$ _____ —106.4° C.
F.P. dep. _____ 0.1° C.
$d_4^{20}$ g./ml. _____ 1.9317
$n_D^{20}$ _____ 1.4304
$MR_D$ _____ 24.3

It will be obvious to those skilled in the art that many modifications may be made within the scope of the present invention without departing from the spirit thereof, and the invention includes all such modifications.

I claim:

1. A process which comprises effecting the reaction under free radical conditions initiated solely by photochemical dissociation of a compound having the formula $$Br-\underset{X_2}{\overset{X}{C}}-X_1$$

in which X is selected from the group consisting of fluorine, chlorine, and perhaloalkyl radicals having not more than about 8 carbon atoms and in which all the halogen atoms have atomic weights not in excess of 35.46; and $X_1$ and $X_2$ are selected from the group consisting of fluorine and chlorine; with a compound having the formula $$CF_2=CYR_h$$

in which Y is selected from the group consisting of fluorine and chlorine and $R_h$ is selected from the group consisting of perhaloalkyl and perhaloalkenyl radicals having not more than about 8 carbon atoms and in which all of the halogen atoms have atomic weights not in excess of 35.46 to produce a monomeric addition product.

2. A process for the preparation of the compound $$CF_3CBrFCF_2CCl_3$$

which comprises effecting the reaction under free radical conditions initiated solely by photochemical dissociation of the compound $CBrCl_3$ with the compound $$CF_3CF=CF_2$$

3. A process for the preparation of the compound $$CF_3CBrClCF_2CCl_3$$

which comprises effecting the reaction under free radical conditions initiated solely by photochemical dissociation of the compound $CBrCl_3$ with the compound $$CF_3CCl=CF_2$$

4. Compounds having the formula $$CF_3CBrXCF_2CCl_3$$

in which X is selected from the group consisting of fluorine and chlorine.

5. Compounds having the formula $$Cl-\underset{X_1}{\overset{X}{C}}-CF=CClF_2$$

in which X and $X_1$ are selected from the group consisting of fluorine and chlorine.

6. A compound having the formula $$CClF_2CF=CClCF_3$$

7. A compound having the formula $$CCl_2FCF=CClCF_3$$

8. A compound having the formula $$CCl_3CF=CClCF_3$$

9. A process which comprises effecting the reaction under free radical conditions of a compound having the formula $$Br-\underset{X_2}{\overset{X}{C}}-X_1$$

in which X is selected from the group consisting of fluorine, chlorine and perhaloalkyl radicals having not more than eight carbon atoms and in which all of the halogen atoms have atomic weights not in excess of 35.46; and $X_1$ and $X_2$ are selected from the group consisting of chlorine and fluorine; with a compound having the formula $$CF_2=CYR_h$$

in which Y is selected from the group consisting of fluorine and chlorine and $R_h$ is selected from the group consisting of perhaloalkyl and perhaloalkenyl radicals having not more than eight carbon atoms and in which all of the halogen atoms have atomic weights not in excess of 35.46; to produce a monomeric addition product; and reacting the monomeric addition product with sodium iodide to produce a perhalogenated alkene containing more carbon atoms than the initial perhalogenated alkene.

10. A process for the preparation of the compound $CCl_3CF=CClCF_3$ which comprises effecting the reaction under free radical conditions of the compound $CBrCl_3$ with the compound $CF_3CCl=CF_2$ to produce the compound $CF_3CBrClCF_2CCl_3$ and reacting $$CF_3CBrClCF_2CCl_3$$

with sodium iodide to produce 1,1,1,3-tetrachloro-2,4,4,4-tetrafluorobutene-2.

11. A process for the preparation of the compounds $CCl_2FCF=CClCF_3$ and $CClF_2CF=CClCF_3$ which comprises effecting the reaction under free radical conditions of the compound $CBrCl_3$ with the compound $$CF_3CCl=CF_2$$

to produce the compound $CF_3CBrClCF_2CCl_3$; reacting $CF_3CBrClCF_2CCl_3$ with sodium iodide to produce $$CF_3CCl=CFCCl_3$$

and reacting $CF_3CCl=CFCCl_3$ with mercuric oxide-hydrogen fluoride.

12. A process which comprises effecting the reaction under free radical conditions of a compound having the formula $$Br-\underset{X_2}{\overset{X}{C}}-X_1$$

in which X is selected from the group consisting of fluorine, chlorine, and perhaloalkyl radicals having not more than eight carbon atoms and in which all of the halogen atoms have atomic weights not in excess of 35.46; and $X_1$ and $X_2$ are selected from the group consisting of chlorine and fluorine; with a compound having the formula $$CF_2\!\!=\!\!CYR_h$$

in which Y is selected from the group consisting of fluorine and chlorine and $R_h$ is selected from the group consisting of perhaloalkyl and perhaloalkenyl radicals having not more than eight carbon atoms and in which all of the halogen atoms have atomic weights not in excess of 35.46; to produce a monomeric addition product; reacting the monomeric addition product with sodium iodide to produce a perhalogenated alkene containing more carbon atoms than the initial perhalogenated alkene and chlorinating the product thus obtained.

13. A process which comprises effecting the reaction under free radical conditions of the compound $CBrCl_3$ with the compound $CF_3CCl\!\!=\!\!CF_2$ to produce the compound $CF_3CBrClCF_2CCl_3$; reacting $CF_3CBrClCF_2CCl_3$ with sodium iodide to produce $CF_3CCl\!\!=\!\!CFCCl_3$; reacting $CF_3CCl\!\!=\!\!CFCCl_3$ with mercuric oxide-hydrogen fluoride and chlorinating the product thus produced.

References Cited in the file of this patent
UNITED STATES PATENTS

| | | |
|---|---|---|
| 2,436,357 | Gochenour et al. | Feb. 17, 1948 |
| 2,705,706 | Dittman et al. | Apr. 5, 1955 |

UNITED STATES PATENT OFFICE
Certificate of Correction

Patent No. 2,880,248                              March 31, 1959

William T. Miller

It is hereby certified that error appears in the printed specification of the above numbered patent requiring correction and that the said Letters Patent should read as corrected below.

Columns 3 and 4, approximately lines 33 and 34, should read $$CF_2CCl_2CClFCF_3 \xleftarrow{Cl_2} CF_2CCl=CFCF_3$$

column 5, lines 22 and 23, for "contens" read —contents—; column 8, line 58, for "1,3885" read —1.3885—.

Signed and sealed this 18th day of August 1959.

[SEAL]

Attest:
KARL H. AXLINE,
*Attesting Officer.*

ROBERT C. WATSON,
*Commissioner of Patents.*